US010695955B2

(12) United States Patent
Yamada et al.

(10) Patent No.: US 10,695,955 B2
(45) Date of Patent: Jun. 30, 2020

(54) MOLD MANUFACTURING METHOD AND ANTI-REFLECTIVE FILM MANUFACTURING METHOD (71) Applicant: Sharp Kabushiki Kaisha, Sakai, Osaka (JP)

(72) Inventors: Nobuaki Yamada, Sakai (JP); Hidekazu Hayashi, Sakai (JP); Miho Yamada, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 306 days.

(21) Appl. No.: 15/524,385

(22) PCT Filed: Oct. 30, 2015

(86) PCT No.: PCT/JP2015/080777
§ 371 (c)(1),
(2) Date: May 4, 2017

(87) PCT Pub. No.: WO2016/072362
PCT Pub. Date: May 12, 2016

(65) Prior Publication Data
US 2018/0281238 A1 Oct. 4, 2018

(30) Foreign Application Priority Data
Nov. 6, 2014 (JP) ................. 2014-226162

(51) Int. Cl.
C25D 11/04 (2006.01)
B29C 33/38 (2006.01)
(Continued)

(52) U.S. Cl.
CPC .......... B29C 33/3842 (2013.01); B29C 33/38 (2013.01); B29C 33/424 (2013.01);
(Continued)

(58) Field of Classification Search
None
See application file for complete search history.

(56) References Cited

U.S. PATENT DOCUMENTS 6,359,735 B1    3/2002   Gombert et al.
2003/0205475 A1  11/2003  Sawitowski
(Continued)

FOREIGN PATENT DOCUMENTS

JP    2001-517319 A    10/2001
JP    2003-531962 A    10/2003
(Continued)

OTHER PUBLICATIONS

Montero-Moreno et al. "Influence of the aluminum surface on the final results of a two-step anodizing" Surface & Coatings Technology, 201, 2007, 6352-6357 (Year: 2007).*
(Continued)

Primary Examiner — Stefanie S Wittenberg
(74) Attorney, Agent, or Firm — ScienBiziP, P.C.

(57) ABSTRACT

A manufacturing method of a mold, the mold having at its surface a plurality of recessed portions whose two-dimensional size is not less than 10 nm and less than 500 nm when viewed in a direction normal to the surface, the method comprising: (a) providing a mold base (10); (b) partially anodizing the aluminum alloy layer (18), thereby forming a porous alumina layer (14) which has a plurality of minute recessed portions (14p); (c) bringing the porous alumina layer into contact with an etching solution, thereby enlarging the plurality of minute recessed portions; (d) detecting a protrusion (210) formed at a surface of the porous alumina layer or the mold base; (e) determining whether or not a height of the detected protrusion is greater than a predetermined height; and (f) if it is determined at step (e) that the height of the protrusion is greater, irradiating the protrusion (Continued)

with laser light such that the height of the protrusion becomes smaller than the predetermined height.

20 Claims, 6 Drawing Sheets (51) Int. Cl.
*B29C 59/02* (2006.01)
*C25D 11/12* (2006.01)
*G02B 1/118* (2015.01)
*B29C 37/00* (2006.01)
*B29C 33/42* (2006.01)
*C25D 11/24* (2006.01)
*B29C 33/72* (2006.01)
*C25D 11/10* (2006.01)
*C25D 11/08* (2006.01)

(52) U.S. Cl.
CPC .......... *B29C 33/72* (2013.01); *B29C 37/0096* (2013.01); *B29C 59/02* (2013.01); *C25D 11/04* (2013.01); *C25D 11/12* (2013.01); *C25D 11/24* (2013.01); *G02B 1/118* (2013.01); *B29C 33/3814* (2013.01); *B29C 2059/023* (2013.01); *C25D 11/08* (2013.01); *C25D 11/10* (2013.01)

(56) References Cited

U.S. PATENT DOCUMENTS

| | | | |
|---|---|---|---|
| 2005/0061995 A1* | 3/2005 | Vink | G03F 7/707 250/492.1 |
| 2007/0116934 A1* | 5/2007 | Miller | B32B 3/30 428/172 |
| 2007/0159698 A1 | 7/2007 | Taguchi et al. | |
| 2012/0318772 A1* | 12/2012 | Minoura | C25D 11/12 216/52 |
| 2013/0004612 A1* | 1/2013 | Isurugi | B29C 33/38 425/418 |
| 2015/0140154 A1 | 5/2015 | Isurugi et al. | |

FOREIGN PATENT DOCUMENTS

| | | |
|---|---|---|
| JP | 2009-166502 A | 7/2009 |
| JP | 2014-071312 A | 4/2014 |
| JP | 2014-113710 A | 6/2014 |
| WO | 2011/105206 A1 | 9/2011 |
| WO | 2011/125486 A1 | 10/2011 |
| WO | 2013/183576 A1 | 12/2013 |

OTHER PUBLICATIONS

Hwang et al. "Fabrication of Highly Ordered Pore Array in Anodic Aluminum Oxide", Korean J. Chem. Eng. 19(3), 467-473, 2002 (Year: 2002).*

* cited by examiner

MOLD MANUFACTURING METHOD AND ANTI-REFLECTIVE FILM MANUFACTURING METHOD

TECHNICAL FIELD

The present invention relates to a mold manufacturing method and an antireflection film production method and, for example, to a method for manufacturing a mold whose surface has an inverted moth-eye structure and a method for producing an antireflection film with the use of the mold. In this specification, the "mold" includes molds that are for use in various processing methods (stamping and casting), and is sometimes referred to as a stamper. The "mold" can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a microscopic uneven pattern in which the interval of recessed portions or raised portions is not more than the wavelength of visible light ($\lambda$=380 nm to 780 nm). See Patent Documents 1 to 3. The two-dimensional size of a raised portion of an uneven pattern which performs an antireflection function is not less than 10 nm and less than 500 nm. Here, the "two-dimensional size" of the raised portions refers to the area equivalent circle diameter of the raised portions viewed in a direction normal to the surface. For example, when the raised portions have a conical shape, the two-dimensional size of the raised portions is equivalent to the diameter of the base of the cone. The same applies to the "two-dimensional size" of the recessed portions.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby, for example, reflection of the visible light band is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

The present applicant has developed a method of producing an antireflection film (or antireflection surface) which has a moth-eye structure with the use of an anodized porous alumina layer obtained by anodization of aluminum (Patent Documents 2 to 5).

Utilizing an anodized porous aluminum film can facilitate the manufacture of a mold which is used for formation of a moth-eye structure over a surface (hereinafter, "moth-eye mold"). In particular, as described in Patent Documents 2 to 5, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

The entire disclosures of Patent Documents 1 to 5 are incorporated by reference in this specification.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2009-166502
Patent Document 4: WO 2011/125486
Patent Document 5: WO 2013/183576
Patent Document 6: Japanese Laid-Open Patent Publication No. 2014-113710
Patent Document 7: Japanese Laid-Open Patent Publication No. 2014-71312

SUMMARY OF INVENTION

Technical Problem

The present inventors produced antireflection films using a moth-eye mold and encountered such a problem that some of the antireflection films had defects ranging in size from 200 μm to 3 mm. When such an antireflection film is placed over a display, for example, some of images viewed through the antireflection film were distorted. Details of this defect will be described later.

The present invention was conceived in order to solve the above-described problems. The major objects of the present invention include providing a mold manufacturing method which is capable of improving the production yield of a film whose surface has a moth-eye structure and providing a method which is capable of efficiently producing such a film.

Solution to Problem

A mold manufacturing method of an embodiment of the present invention is a manufacturing method of a mold, the mold having at its surface a plurality of recessed portions whose two-dimensional size is not less than 10 nm and less than 500 nm when viewed in a direction normal to the surface, the method including: (a) providing a mold base which includes a metal base and an aluminum alloy layer formed on the metal base; (b) partially anodizing the aluminum alloy layer, thereby forming a porous alumina layer which has a plurality of minute recessed portions; (c) after step (b), bringing the porous alumina layer into contact with an etching solution, thereby enlarging the plurality of minute recessed portions of the porous alumina layer; (d) detecting a protrusion formed at a surface of the porous alumina layer or the mold base; (e) determining whether or not a height of the protrusion detected at step (d) is greater than a predetermined height; and (f) if it is determined at step (e) that the height of the protrusion is greater than the predetermined height, irradiating the protrusion with laser light such that the height of the protrusion becomes smaller than the predetermined height.

In one embodiment, step (d) includes detecting a protrusion formed at the surface of the porous alumina layer, and step (d), step (e) and step (f) are performed after step (b) and step (c).

In one embodiment, step (d) includes detecting a protrusion formed at the surface of the mold base, and step (d), step (e) and step (f) are performed before step (b) and step (c).

In one embodiment, the predetermined height is not less than 3 μm and not more than 200 μm.

In one embodiment, the predetermined height is not less than 10 μm and not more than 30 μm.

In one embodiment, the mold base further includes an inorganic underlayer formed between the metal base and the aluminum alloy layer.

In one embodiment, the mold manufacturing method further includes (g) after step (c), further performing anodization to grow the plurality of minute recessed portions.

In one embodiment, step (b) and step (c) are further performed after step (g).

An antireflection film production method of an embodiment of the present invention includes: providing a mold manufactured by the mold manufacturing method as set forth in any of the above paragraphs; providing a work; irradiating a photocurable resin applied between the mold and a surface of the work with light, thereby curing the photocurable resin; and peeling the mold off from an antireflection film formed of the cured photocurable resin.

In one embodiment, the photocurable resin is applied to the surface of the work, and a thickness of the photocurable resin applied to the surface of the work is equal to or greater than the predetermined height.

In one embodiment, the thickness of the photocurable resin applied to the surface of the work is not less than 3 μm and not more than 200 μm.

In one embodiment, the thickness of the photocurable resin applied to the surface of the work is not less than 10 μm and not more than 30 μm.

Advantageous Effects of Invention

According to an embodiment of the present invention, a mold can be manufactured which is capable of, for example, improving the production yield of a film whose surface has a moth-eye structure. According to another embodiment of the present invention, a method is provided which is capable of efficiently producing such a film.

BRIEF DESCRIPTION OF DRAWINGS

FIG. 4(a) is an image of a portion of the surface of a comparative example moth-eye mold 200 corresponding to a defect in an antireflection film, which was observed using a scanning electron microscope (SEM). (b) is a SEM image of a cross section of the portion of the surface of the moth-eye mold 200 corresponding to the defect in the antireflection film. (c) is a graph showing the result of a composition analysis of an attached object at an encircled portion of (b).

DESCRIPTION OF EMBODIMENTS

Figure 4:
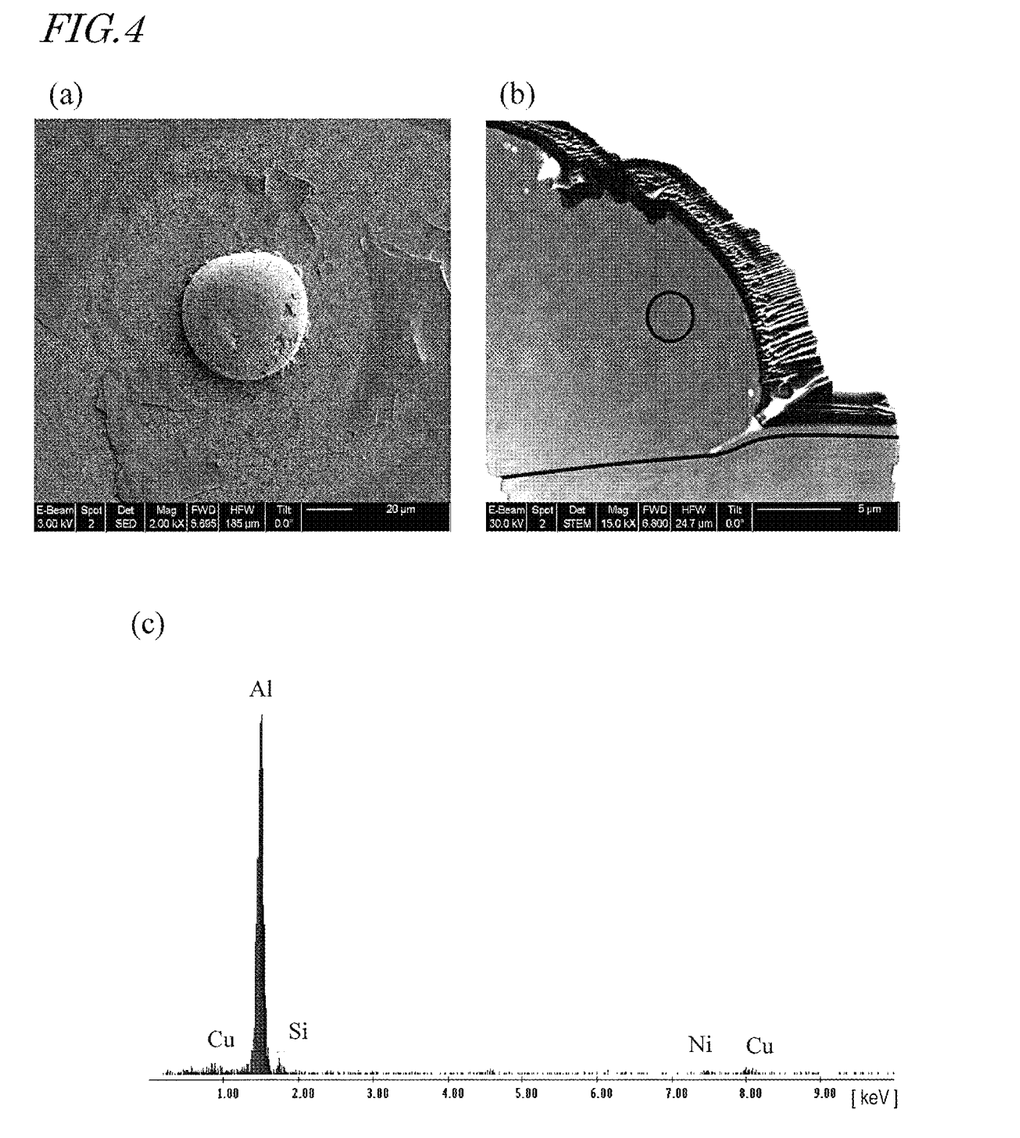

Firstly, the causes of defects in the antireflection film which were found by the present inventors are described with reference to FIG. 4 to FIG. 6.

The surface of a moth-eye mold 200 (hereinafter, also referred to as "comparative example moth-eye mold"), which caused the defects in the antireflection film, was examined. FIG. 4(a) is a SEM image of a portion of the surface of the moth-eye mold 200 corresponding to a defect in an antireflection film, which was observed using a scanning electron microscope (SEM). FIG. 4(b) is a SEM image of a cross section of the portion of the surface of the moth-eye mold 200 corresponding to the defect in the antireflection film. FIG. 4(c) is a graph showing the result of a composition analysis of the attached object at an encircled portion of FIG. 4(b) with the use of an energy-dispersive X-ray spectrometer (EDS). The energy-dispersive X-ray spectrometer used in the composition analysis was JED-2200 manufactured by JEOL Ltd.

As shown in FIG. 4(a) and FIG. 4(b), it was found that a portion of the surface of the moth-eye mold 200 corresponding to the defect in the antireflection film had an attached object in the shape of a deformed sphere (e.g., a circular zabuton cushion shape). As seen from FIG. 4(a), the size of the attached object was several tens of micrometers (μm). For example, in the example shown in FIG. 4(a), the size of the attached object was about 60 μm. Here, the size of the attached object refers to the area equivalent circle diameter of the attached object viewed in a direction normal to the surface of the moth-eye mold. In the antireflection film, a defect occurred over a range of several hundreds of micrometers (μm) to several millimeters (mm), e.g., from 200 μm to 3 mm. Therefore, it was found that the size of the defect was several tens to several hundreds of times greater than the size of the attached object.

The following problem occurs due to the size of the defect in the antireflection film which is several tens to several hundreds of times greater than the size of the attached object on the surface of the moth-eye mold. When the moth-eye mold that has an attached object on the surface is used to produce an antireflection film, there is a probability that a defect occurs over a range of several hundreds of micrometers (μm) to several millimeters (mm). The defect occurring over this range is perceived by an observer's eye and, thus, the antireflection film can be a defective product. Meanwhile, the size of the attached object is several tens of micrometers (μm) and, thus, it is difficult to find the attached object by visual inspection across the surface of the moth-eye mold before production of the antireflection film. Therefore, it is difficult to suppress the decrease in the production yield of the antireflection film.

The mechanism of occurrence of a defect in an antireflection film, which is attributed to the attached object on the surface of the moth-eye mold, produced with the use of the mold, over a range of several tens to several hundreds of times greater than the attached object is described with reference to FIG. 5. FIG. 5(a) to FIG. 5(c) are schematic cross-sectional views for illustrating occurrence of a defect in an antireflection film which is produced using the comparative example moth-eye mold 200.

As shown in FIG. 5(a), for the purpose of producing an antireflection film, the moth-eye mold 200 and a work 42 which has a UV-curable resin 32' over its surface are provided. The moth-eye mold 200 has an inverted moth-eye structure over the surface.

The surface of the moth-eye mold 200 has one or a plurality of attached objects 210. When an attached object 210 attaches to the surface of the moth-eye mold 200, the shape of the attached object 210 is, for example, generally spherical as shown in FIG. 5(a). The shape of the attached object 210 can be generally spherical before the step of pressing the work 42 against the moth-eye mold 200 which will be described with reference to FIG. 5(b). The UV-curable resin 32' is applied to, for example, the surface of the work 42. The UV-curable resin 32' applied over the surface of the work 42 has a generally constant thickness h32'. The height h210 of the attached object 210 is, for example, greater than the thickness h32' of the UV-curable resin 32'. Here, the height h210 of the attached object 210 refers to a height in a direction normal to the surface of the moth-eye mold 200. The thickness h32' of the UV-curable resin 32' refers to a thickness in a direction normal to the surface of the work 42 (or the moth-eye mold 200). The size w210 of the attached object 210 is, for example, 20 µm to 200 µm.

As shown in FIG. 5(b), the work 42 which has the UV-curable resin 32' over its surface is maintained pressed against the moth-eye mold 200, and the UV-curable resin 32' is irradiated with ultraviolet (UV) light such that the UV-curable resin 32' is cured. Here, since the height h210 of the attached object 210 is greater than the thickness h32' of the UV-curable resin 32' (see FIG. 5(a)), the UV-curable resin 32' has a greater thickness in a region of the size w32d with the attached object 210 at its center than in the surrounding region. The thickness h32' of the UV-curable resin 32' (see FIG. 5(b)) in the surrounding region is generally equal to the thickness h32' of the UV-curable resin 32' shown in FIG. 5(a). Such an uneven thickness of the UV-curable resin 32' which is attributed to the attached object 210 causes a defect 32d in the region of the size w32d in a produced antireflection film 32 as shown in FIG. 5(c). The size w32d of the defect 32d is several tens to several hundreds of times greater than the size w210 of the attached object 210. The size w32d of the defect 32d refers to the area equivalent circle diameter of the defect 32d viewed in a direction normal to the antireflection film 32.

For example, a pinch roller 44 can be used to press the work 42 against the moth-eye mold 200. The UV-curable resin 32' used can be, for example, an acrylic resin. The work 42 may be, for example, a TAC (triacetyl cellulose) film.

When the work 42 is pressed against the moth-eye mold 200, the attached object 210 can have the shape of a deformed sphere. In the step illustrated in FIG. 5(b), the height h210 of the attached object 210 can be smaller and the size w210 of the attached object 210 can be greater than in the step illustrated in FIG. 5(a). These variations have a tendency to increase as the height h210 of the attached object 210 increases. Note that, however, also in the step illustrated in FIG. 5(b), the height h210 of the attached object 210 is greater than the thickness h32' of the UV-curable resin 32'. When the work 42 is pressed against the moth-eye mold 200, a crack sometimes appears in the surface of the attached object 210 as shown in FIG. 4(a). The crack can be, for example, streaky in the surface of the attached object 210. For example, when the height h210 of the attached object 210 is large, bubbles 33 occur in the UV-curable resin 32' around the attached object 210.

Thereafter, as shown in FIG. 5(c), the moth-eye mold 200 is separated (peeled off) from the work 42, whereby a cured material layer (antireflection film) 32 to which the uneven structure of the moth-eye mold 200 (inverted moth-eye structure) is transferred is formed on the surface of the work 42. In the antireflection film 32, the defect 32d occurs over the region of the size w32d. At the defect 32d, the thickness of the film is greater than in the surrounding region. The defect 32d has, for example, a lens-like shape. When the antireflection film 32 is placed over the display surface of a display, for example, an image viewed through the antireflection film 32 can be distorted due to the defect 32d. The thickness h32 of the antireflection film 32 in a region surrounding the defect 32d is generally equal to the thickness h32' of the UV-curable resin 32' shown in FIG. 5(a).

The term "defect" used in this specification as for a film (e.g., antireflection film), such as the defect 32d described above, includes a condition that a portion of the film has a greater thickness than its surrounding portion of the film. When a film which has such a defect is placed over the display surface of a display, for example, an image viewed through the defect portion can sometimes be distorted.

Next, the present inventors carried out research concerning where in the manufacturing process of the moth-eye mold 200 the attached object 210 occurred.

The comparative example moth-eye mold 200 can be manufactured by a method disclosed in Patent Documents 2 to 5. The method for manufacturing the comparative example moth-eye mold 200 includes the following steps, Step (A') to Step (C'), as will be described later with reference to FIG. 1(a) to FIG. 1(e).

Figure 1:
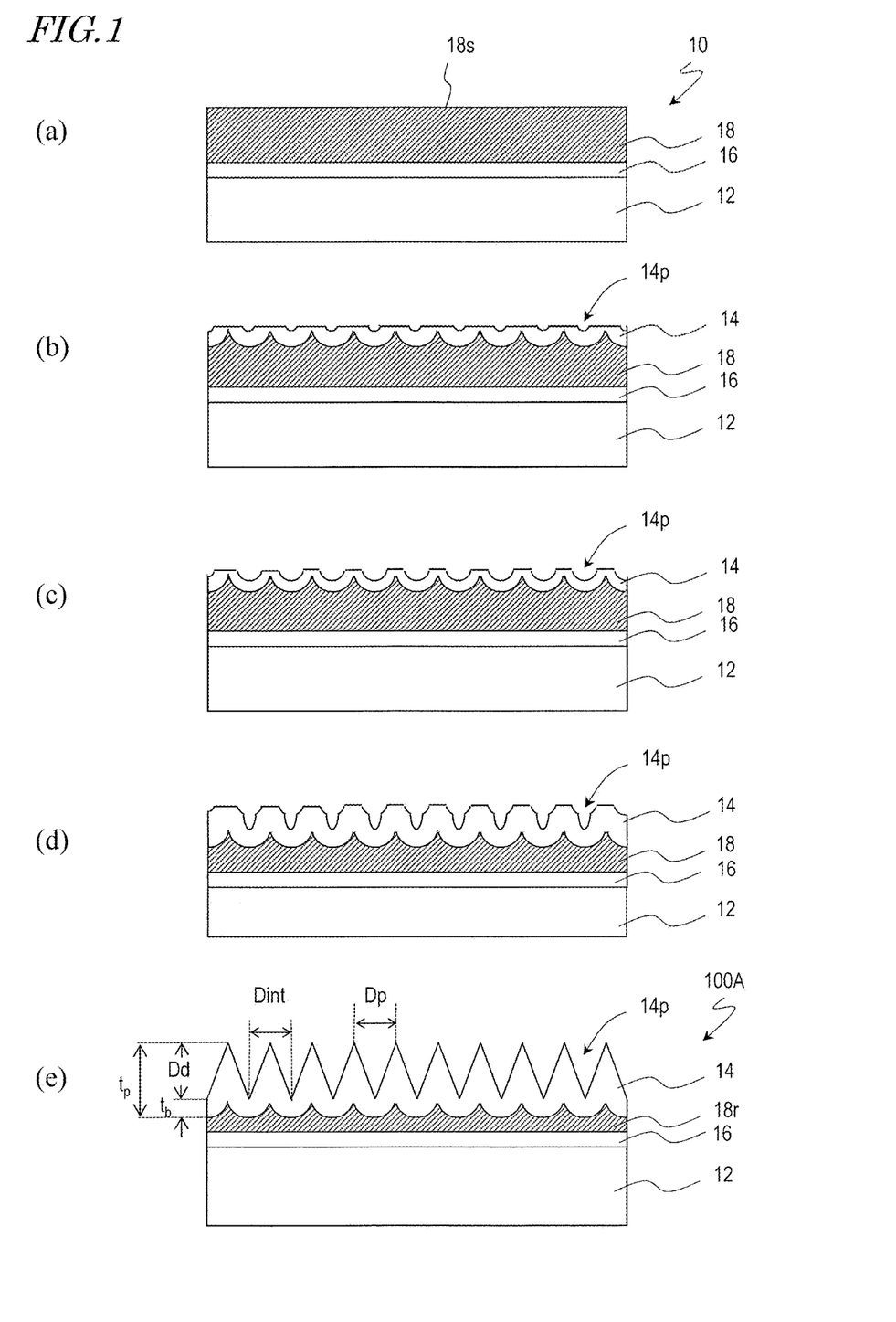
FIG. 1(a) to (e) are schematic cross-sectional views for illustrating a manufacturing method of a moth-eye mold 100A of Embodiment 1 of the present invention.

Step (A'): Providing a mold base 10 which includes a metal base 12, an inorganic underlayer 16 formed on the metal base 12, and an aluminum alloy layer 18 deposited on the inorganic underlayer 16.

Step (B'): Partially anodizing the aluminum alloy layer 18 to form a porous alumina layer 14 which has a plurality of micro recessed portions 14p.

Step (C'): After Step (B'), bringing the porous alumina layer 14 into contact with an etching solution, thereby enlarging the plurality of micro recessed portions 14p of the porous alumina layer 14.

The present inventors analyzed the constituents of the attached object 210 and found that, as seen from FIG. 4(c), aluminum (Al) is the major constituent, and the attached object 210 has the same constituents as those of the aluminum alloy layer 18. Also, as seen from FIG. 4(b), the surface of the attached object 210 has a porous alumina layer which has an inverted moth-eye structure. It is estimated from these findings that the attached object 210 occurred after formation of the aluminum alloy layer 18 at the surface of the moth-eye mold 200 and before the anodization step (i.e., after Step (A') and before Step (B')). The formation of the aluminum alloy layer 18 is carried out by, for example, sputtering in a chamber (vacuum chamber). It is estimated that, in the step of opening the chamber to the air for taking out a mold base from the chamber after an aluminum alloy is deposited to form the aluminum alloy layer 18, a clod (particle) of the aluminum alloy in the chamber attaches to the surface of the aluminum alloy layer 18, resulting in occurrence of the attached object 210.

The attached object 210 occurring on the surface of the aluminum alloy layer 18 has the same composition as that of the aluminum alloy layer 18 and therefore has high adhesion to the aluminum alloy layer 18. The problem of difficulty in removing the attached object 210 arises. Even when the surface of the moth-eye mold 200 is washed before the anodization step, it is difficult to thoroughly remove the attached object 210.

To manufacture a mold for formation of a moth-eye structure which has regularly-arranged raised portions, for example, the step of forming a porous alumina layer which has a thickness of, for example, about 0.1 μm to 0.3 μm and thereafter removing the formed porous alumina layer by etching may be performed between Step (A') and Step (B'). This is because, when a porous alumina layer is formed and then this porous alumina layer is removed, a porous alumina layer having regularly-arranged recessed portions can be formed without being influenced by irregularities which are attributed to grains that are present at the surface of an aluminum film or aluminum base or the process strain. Even when the above-described step is further performed, it is difficult to substantially thoroughly remove the attached object 210 because the attached object 210 has the same composition as that of the aluminum alloy layer 18.

The present inventors measured the height h210 and the size w210 of the attached object 210 on the surface. FIG. 6 is a graph in which the size w210 of the attached object 210 on the surface of the moth-eye mold 200 is plotted against the height h210.

Of attached objects 210 on the moth-eye mold 200 which were at positions corresponding to defects 32d in an antireflection film 32 produced with the use of the moth-eye mold 200, 18 samples were taken, and the height h210 and the size w210 of each sample were determined. The height h210 and the size w210 were determined from a SEM image which was observed using a scanning electron microscope (SEM) (S-4700 manufactured by Hitachi High-Technologies Corporation).

The thickness h32' of the UV-curable resin 32' was 6 μm, in each case, before the work 42 was pressed against the moth-eye mold 200 (see FIG. 5(a)). As seen from FIG. 6, the height h210 of the attached object 210 is not less than 6 μm in each case. It was thus verified that the height h210 of the attached object 210 which can be the cause of the defect 32d in the antireflection film 32 is equal to the thickness h32' of the UV-curable resin 32' or greater than the thickness h32' of the UV-curable resin 32'.

Since the measurement of the attached objects 210 was carried out after the work 42 was pressed against the moth-eye mold 200, it is estimated that, as previously described, the height h210 of the attached objects 210 before the work 42 was pressed against the moth-eye mold 200 was greater than the measurements. Thus, it is estimated that the height h210 of the attached object 210 which can be the cause of the defect 32d in the antireflection film 32 is greater than the thickness h32' of the UV-curable resin 32'.

Hereinafter, mold manufacturing methods of embodiments of the present invention will be described with reference to the drawings. A mold of the present embodiment is a mold which has over its surface a plurality of recessed portions whose two-dimensional size viewed in the normal direction of the surface is not less than 10 nm and less than 500 nm. A mold of an embodiment of the present invention is a moth-eye mold which has, for example, an inverted moth-eye structure over its surface. The moth-eye mold may be in the shape of a hollow cylinder or may be in the shape of a plate. Particularly as disclosed in WO 2011/105206 of the present applicant, when a moth-eye mold in the shape of a hollow cylinder is used, the antireflection film can be efficiently produced according to a roll-to-roll method. The entire disclosure of WO 2011/105206 is incorporated by reference in this specification. Note that the present invention is not limited to the embodiments which will be described in the following sections. In the drawings mentioned in the following sections, components which have substantially the same functions are designated by the same reference numerals, and the descriptions thereof are sometimes omitted.

Embodiment 1

A mold manufacturing method of Embodiment 1 of the present invention includes the following steps, Step (A) to Step (F).

Step (A): Providing a mold base which includes a metal base and an aluminum alloy layer formed on the metal base.

Step (B): Partially anodizing the aluminum alloy layer to form a porous alumina layer which has a plurality of minute recessed portions (also referred to as "anodization step").

Step (C): After Step (B), bringing the porous alumina layer into contact with an etching solution, thereby enlarging the plurality of minute recessed portions of the porous alumina layer (also referred to as "etching step").

Step (D): Detecting a protrusion formed at the surface of the porous alumina layer (also referred to as "detection step").

Step (E): Determining whether or not the height of the protrusion detected at Step (D) is higher than a predetermined height (also referred to as "determination step").

Step (F): If it is determined at Step (E) that the height of the protrusion is higher than the predetermined height, irradiating the protrusion with laser light to make the height of the protrusion lower than the predetermined height (also referred to as "laser light irradiation step").

The predetermined height in Step (E) and Step (F) is, for example, equal to the thickness h32' of the UV-curable resin 32' (see FIG. 5(a)) applied to the work 42.

Step (D), Step (E) and Step (F) are performed, for example, after Step (B) and Step (C).

According to the mold manufacturing method of Embodiment 1 of the present invention, an attached object which can be the cause of a defect in an antireflection film produced with the use of the mold can be selectively removed. An attached object which can be the cause of a defect in an antireflection film can be removed before the antireflection film is produced with the use of the mold. The decrease in the production yield of the film produced with the use of the mold can be suppressed.

Next, a mold manufacturing method of Embodiment 1 of the present invention and the configuration of a mold manufactured by the manufacturing method are specifically described with reference to FIG. 1(a) to FIG. 1(e) and FIG. 2(a) to FIG. 2(d). FIG. 1(a) to FIG. 1(e) and FIG. 2(a) to FIG. 2(d) are schematic cross-sectional views for illustrating a manufacturing method of a moth-eye mold 100A of Embodiment 1 of the present invention. FIG. 1(a) to FIG. 1(e) are schematic diagrams of a portion of the moth-eye mold 100A which does not have an attached object 210 at its surface through the manufacturing process. FIG. 2(a) to FIG. 2(d) are schematic diagrams of a portion of the moth-eye mold 100A which has an attached object 210 at its surface through the manufacturing process.

Firstly, as shown in FIG. 1(a), a mold base 10 is provided which includes a metal base 12 and an aluminum alloy layer 18 formed on the metal base 12. As shown in FIG. 2(a), the surface 18s of the mold base 10 has an attached object 210.

As illustrated in FIG. 1(a), the mold base 10 may further include an inorganic underlayer 16 between the metal base 12 and the aluminum alloy layer 18. The mold manufacturing method of Embodiment 1 may further include the step of forming the inorganic underlayer 16 on the metal base 12 after the step of providing the metal base 12 and before the step of forming the aluminum alloy layer 18.

The metal base 12 used can be an aluminum base 12 whose aluminum purity is not less than 99.50 mass % and less than 99.99 mass % and which has relatively high rigidity. The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a hollow cylinder is prepared by extrusion, the Mg content is preferably 2.0 mass % or less. If the Mg content exceeds 2.0 mass %, the extrudability deteriorates in general.

The aluminum base 12 used may be an aluminum pipe in the shape of a hollow cylinder which is made of, for example, JIS A1050, an Al—Mg based alloy (e.g., JIS A5052), or an Al—Mg—Si based alloy (e.g., JIS A6063).

The surface of the aluminum base 12 is preferably a surface cut with a bit. If, for example, abrasive particles are remaining on the surface of the aluminum base 12, conduction will readily occur between the aluminum alloy layer 18 and the aluminum base 12 in a portion in which the abrasive particles are present. Not only in the portion in which the abrasive particles are remaining but also in a portion which has a roughened surface, conduction readily occurs between the aluminum alloy layer 18 and the aluminum base 12. When conduction occurs locally between the aluminum alloy layer 18 and the aluminum base 12, there is a probability that a local cell reaction will occur between an impurity in the aluminum base 12 and the aluminum alloy layer 18.

The material of the inorganic underlayer 16 may be, for example, tantalum oxide ($Ta_2O_5$) or silicon dioxide ($SiO_2$). The inorganic underlayer 16 can be formed by, for example, sputtering. When a tantalum oxide layer is used as the inorganic underlayer 16, the thickness of the tantalum oxide layer is, for example, 200 nm.

The thickness of the inorganic underlayer 16 is preferably not less than 100 nm and less than 500 nm. If the thickness of the inorganic underlayer 16 is less than 100 nm, there is a probability that a defect (typically, a void; i.e., a gap between crystal grains) occurs in the aluminum alloy layer 18. If the thickness of the inorganic underlayer 16 is not less than 500 nm, insulation is likely to occur between the aluminum base 12 and the aluminum alloy layer 18 due to the surface condition of the aluminum base 12. To realize anodization of the aluminum alloy layer 18 by supplying an electric current from the aluminum base 12 side to the aluminum alloy layer 18, the electric current needs to flow between the aluminum base 12 and the aluminum alloy layer 18. When employing a configuration where an electric current is supplied from the inside surface of the aluminum base 12 in the shape of a hollow cylinder, it is not necessary to provide an electrode to the aluminum alloy layer 18. Therefore, the aluminum alloy layer 18 can be anodized across the entire surface, while such a problem does not occur that supply of the electric current becomes more difficult as the anodization advances. Thus, the aluminum alloy layer 18 can be anodized uniformly across the entire surface.

To form a thick inorganic underlayer 16, it is in general necessary to increase the film formation duration. When the film formation duration is increased, the surface temperature of the aluminum base 12 unnecessarily increases, and as a result, the film quality of the aluminum alloy layer 18 deteriorates, and a defect (typically, a void) occurs in some cases. When the thickness of the inorganic underlayer 16 is less than 500 nm, occurrence of such a problem can be suppressed.

The aluminum alloy layer 18 is, for example, a film which is made of aluminum whose purity is not less than 99.99 mass % (hereinafter, sometimes referred to as "high-purity aluminum film") as disclosed in Patent Document 4. The aluminum alloy layer 18 is formed by, for example, vacuum deposition or sputtering. The thickness of the aluminum alloy layer 18 is preferably in the range of not less than about 500 nm and not more than about 1500 nm. For example, the thickness of the aluminum alloy layer 18 is about 1 μm.

The aluminum alloy layer 18 may be an aluminum alloy film disclosed in Patent Document 5 in substitution for the high-purity aluminum film. The aluminum alloy film disclosed in Patent Document 5 contains aluminum, a metal element other than aluminum, and nitrogen. In this specification, the "aluminum film" includes not only the high-purity aluminum film but also the aluminum alloy film disclosed in Patent Document 5.

Using the above-described aluminum alloy film enables to obtain a specular surface whose reflectance is not less than 80%. The average grain diameter of crystal grains that form the aluminum alloy film when viewed in the normal direction of the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %. It is preferred that the absolute value of the difference between the standard electrode potential of the metal element other than aluminum which is contained in the aluminum alloy film and the standard electrode potential of aluminum is not more than 0.64 V, and that the content of the metal element in the aluminum alloy film is not less than 1.0 mass % and not more than 1.9 mass %. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may contain two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 μm.

Then, a surface 18s of the aluminum alloy layer 18 is anodized to form a porous alumina layer 14 which has a plurality of recessed portions (micropores) 14p as shown in FIG. 1(b). The porous alumina layer 14 includes a porous layer which has the recessed portions 14p and a barrier layer (the base of the recessed portions (micropores) 14p). As known in the art, the interval between adjacent recessed portions 14p (the distance between the centers) is approximately twice the thickness of the barrier layer and is approximately proportional to the voltage that is applied during the anodization. This relationship also applies to the final porous alumina layer 14 shown in FIG. 1(e).

The porous alumina layer 14 is formed by, for example, anodizing the surface 18s in an acidic electrolytic solution. The electrolytic solution used in the step of forming the porous alumina layer 14 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum alloy layer 18 is anodized with an applied voltage of 80 V for 55 seconds using an oxalic acid aqueous solution (concentration: 0.3 mass %, solution temperature: 10° C.), whereby the porous alumina layer 14 is formed.

As shown in FIG. 2(b), in the step of anodizing the surface 18s of the aluminum alloy layer 18, the surface 210s of the attached object 210 is also concurrently anodized, whereby a porous alumina layer 214 which has a plurality of recessed portions (not shown) is formed. The plurality of recessed portions of the porous alumina layer 214 are not shown in FIG. 2(b) to FIG. 2(d) for the sake of simplicity but may be the same as the plurality of recessed portions 14p of the porous alumina layer 14. There is a probability that the porous alumina layer 14 is not formed on a portion of the surface 18s of the aluminum alloy layer 18 which is in contact with the attached object 210.

Then, the porous alumina layer 14 is brought into contact with an etchant such that a predetermined amount is etched away, whereby the opening of the recessed portions 14p is enlarged as shown in FIG. 1(c). By modifying the type and concentration of the etching solution and the etching duration, the etching amount (i.e., the size and depth of the recessed portions 14p) can be controlled. The etching solution used may be, for example, an aqueous solution of 10 mass % phosphoric acid, organic acid such as formic acid, acetic acid or citric acid, or sulfuric acid, or a chromic/phosphoric acid solution. For example, the etching is performed for 20 minutes using a phosphoric acid aqueous solution (10 mass %, 30° C.).

Here, the openings of the plurality of recessed portions of the porous alumina layer 214 formed on the surface 210s of the attached object 210 are also concurrently enlarged as well as in the porous alumina layer 14. Note that, however, it is estimated that the height h210 and the size w210 of the attached object 210 hardly change in the steps of anodizing and etching the surface 210s of the attached object 210.

Then, the aluminum alloy layer 18 is again partially anodized such that the recessed portions 14p are grown in the depth direction and the thickness of the porous alumina layer 14 is increased as shown in FIG. 1(d). Here, the growth of the recessed portions 14p starts at the bottoms of the previously-formed recessed portions 14p, and accordingly, the lateral surfaces of the recessed portions 14p have stepped shapes.

Thereafter, when necessary, the porous alumina layer 14 may be brought into contact with an alumina etchant to be further etched such that the pore diameter of the recessed portions 14p is further increased. The etching solution used in this step may preferably be the above-described etching solution. Practically, the same etching bath may be used.

In this way, by alternately repeating the anodization step and the etching step as described above through multiple cycles (e.g., 5 cycles: including 5 anodization cycles and 4 etching cycles), the comparative example moth-eye mold 200 that includes the porous alumina layer 14 which has the inverted moth-eye structure is obtained as shown in FIG. 2(c). A portion of the comparative example moth-eye mold 200 which does not have an attached object 210 at the surface may be the same as the moth-eye mold 100A shown in FIG. 1(e). Since the process is ended with the anodization step, the recessed portions 14p have pointed bottom portion. That is, the resultant mold enables formation of raised portions with pointed tip ends.

The porous alumina layer 14 (thickness: $t_p$) shown in FIG. 1(e) includes a porous layer (whose thickness is equivalent to the depth $D_d$ of the recessed portions 14p) and a barrier layer (thickness: $t_b$). Since the porous alumina layer 14 has a structure obtained by inverting the moth-eye structure of the antireflection film 32, corresponding parameters which define the dimensions may sometimes be designated by the same symbols.

The recessed portions 14p of the porous alumina layer 14 may have, for example, a conical shape and may have a stepped lateral surface. It is preferred that the two-dimensional size of the recessed portions 14p (the diameter of a circle equivalent to the area of the recessed portions 14p when viewed in a normal direction of the surface), $D_p$, is more than 20 nm and less than 500 nm, and the depth of the recessed portions 14p, $D_d$, is not less than 50 nm and less than 1000 nm (1 μm). It is also preferred that the bottom portion of the recessed portions 14p is acute (with the deepest part of the bottom portion being pointed). When the recessed portions 14p are in a densely packed arrangement, assuming that the shape of the recessed portions 14p when viewed in a normal direction of the porous alumina layer 14 is a circle, adjacent circles overlap each other, and a saddle portion is formed between adjacent ones of the recessed portions 14p. Note that, when the generally-conical recessed portions 14p adjoin one another so as to form saddle portions, the two-dimensional size of the recessed portions 14p. $D_p$, is equal to the adjoining distance $D_{int}$. The thickness of the porous alumina layer 14, $t_p$, is not more than about 1 μm.

Under the porous alumina layer 14 shown in FIG. 1(e), there is an aluminum remnant layer 18r. The aluminum remnant layer 18r is part of the aluminum alloy layer 18 which has not been anodized. When necessary, the aluminum alloy layer 18 may be substantially thoroughly anodized such that the aluminum remnant layer 18r is not present. For example, when the inorganic underlayer 16 has a small thickness, it is possible to readily supply an electric current from the aluminum base 12 side.

The manufacturing method of the moth-eye mold illustrated herein enables manufacture of a mold which is for production of antireflection films disclosed in Patent Documents 2 to 5. Since an antireflection film used in a high-definition display panel is required to have high uniformity, selection of the material of the aluminum base, specular working of the aluminum base, and control of the purity and components of the aluminum film are preferably carried out as described above. Note that, however, a mold of an embodiment of the present invention is not limited to this example but is widely applicable to production of a film whose surface has a moth-eye structure. When producing a film which is not required to have high uniformity, the above-described mold manufacturing method can be simplified. According to the above-described mold manufacturing method, a mold in which the regularity of the arrangement of the recessed portions is low, and which is suitable to production of an antireflection film, can be manufactured. A mold for formation of a moth-eye structure which has regularly-arranged raised portions can be manufactured, for example, as described in the following section.

For example, after formation of a porous alumina layer having a thickness of about 0.1 µm to 0.3 µm, the formed porous alumina layer is removed by etching, and then, anodization may be performed under the above-described conditions for formation of the porous alumina layer. The porous alumina layer that has a thickness of 0.1 µm to 0.3 µm is realized by appropriately controlling the anodization duration. When the porous alumina layer is thus formed and then this porous alumina layer is removed, a porous alumina layer having regularly-arranged recessed portions can be formed without being influenced by irregularities which are attributed to grains that are present at the surface of an aluminum film or aluminum base or the process strain. Note that, in removal of the porous alumina layer, using a chromic/phosphoric acid solution is preferred. Although continuing the etching for a long period of time sometimes causes galvanic corrosion, the chromic/phosphoric acid solution has the effect of suppressing galvanic corrosion.

Figure 2:
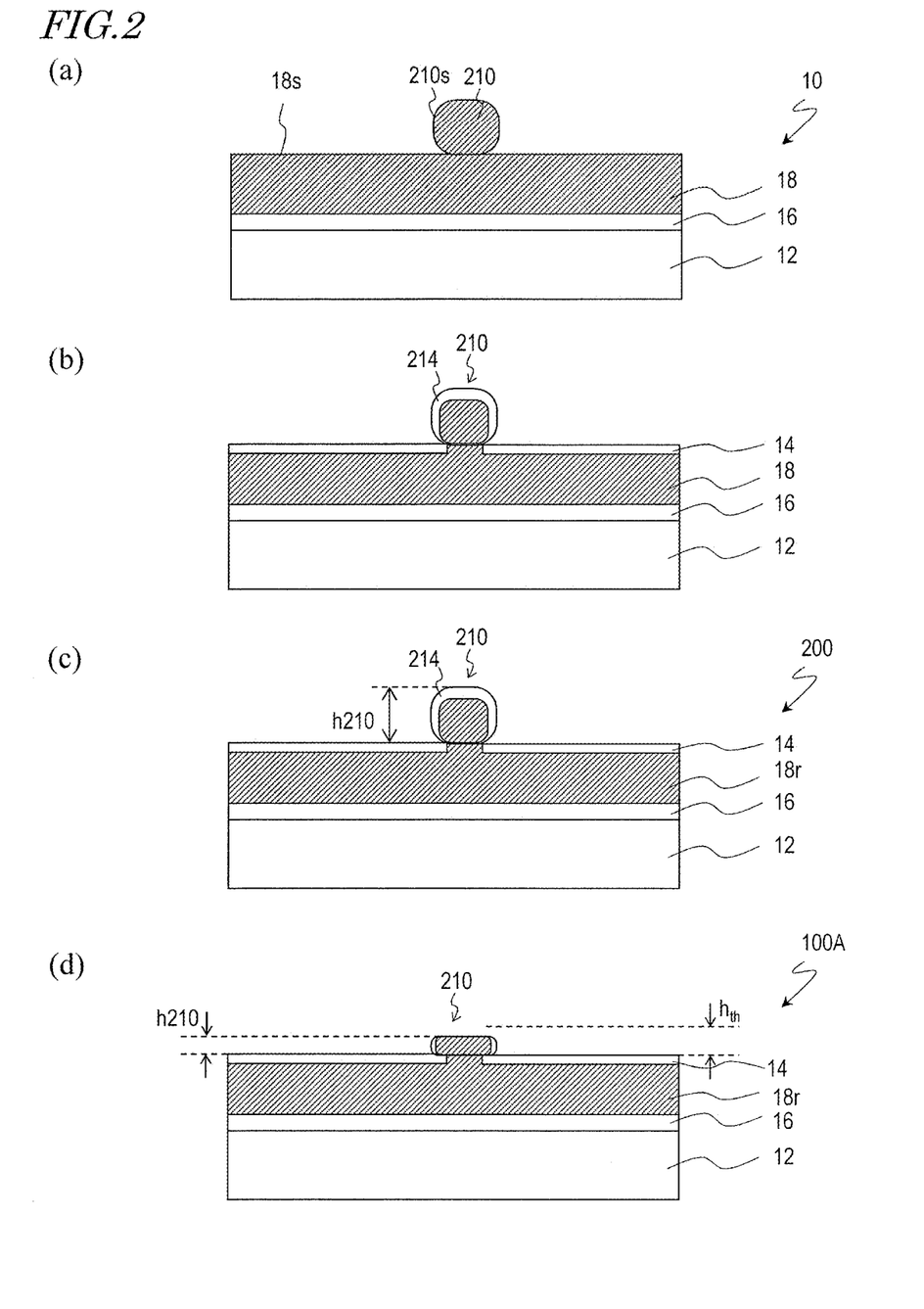
FIG. 2(a) to (d) are schematic cross-sectional views for illustrating a manufacturing method of the moth-eye mold 100A of Embodiment 1 of the present invention.

Then, a protrusion 210 formed at the surface of the moth-eye mold 200 shown in FIG. 2(*c*) is detected. The protrusion 210 includes the above-described attached object 210. For the sake of simplicity, the protrusion 210 and the attached object 210 are sometimes designated by the same reference numeral. The protrusion 210 to be detected includes not only the attached object 210 but also, for example, an object which includes a component different from the attached object 210 (for example, organic matter, cellulose (e.g., including a TAC film), resin (e.g., including a UV-curable resin 32' used for production of the antireflection film 32), etc.) and an object which is attributed to a cause different from that of the attached object 210.

In detection of the protrusion 210, for example, a microscope (e.g., including a laser scanning microscope) is used. Detection of the protrusion 210 includes obtaining information indicative of the position of the protrusion 210 on the moth-eye mold 200. For example, when the moth-eye mold is in the shape of a hollow cylinder, the position in the circumferential direction of the moth-eye mold and the position in a direction perpendicular to the base surface of the moth-eye mold are obtained. In this process, for example, a marker which specifies the position in the circumferential direction of the moth-eye mold can be used as the basis.

In the step of detecting the protrusion 210, only a protrusion (attached object) 210 whose shape is generally circular when viewed in a direction normal to the porous alumina layer 14 may be selected for detection. As previously described, the attached object 210 that can be the cause of a defect in the antireflection film is characteristic in its generally spherical so that it is possible to efficiently detect the protrusion 210 that can be the cause of a defect. Thus, it is possible to efficiently suppress occurrence of a defect in an antireflection film.

Then, it is determined whether or not the height h210 of the detected protrusion 210 is greater than a predetermined height $h_{th}$. It is assumed that the predetermined height $h_{th}$ is equal to, for example, the thickness h32' of the UV-curable resin 32' (see FIG. 5(*a*)) applied to the work 42. The predetermined height $h_{th}$ may be, for example, a smaller value than the thickness h32' of the UV-curable resin 32' (see FIG. 5(*a*)) applied to the work 42. The predetermined height $h_{th}$ is not limited to this example but can be set to an arbitrary value. The predetermined height $h_{th}$ is, for example, not less than 3 µm and not more than 200 µm. The predetermined height $h_{th}$ is, for example, not less than 10 µm and not more than 30 µm. The predetermined height $h_{th}$ is, for example, not more than 10 µm when the thickness h32' of the UV-curable resin 32' (see FIG. 5(*a*)) applied to the work 42 is 10 µm.

Figure 5:
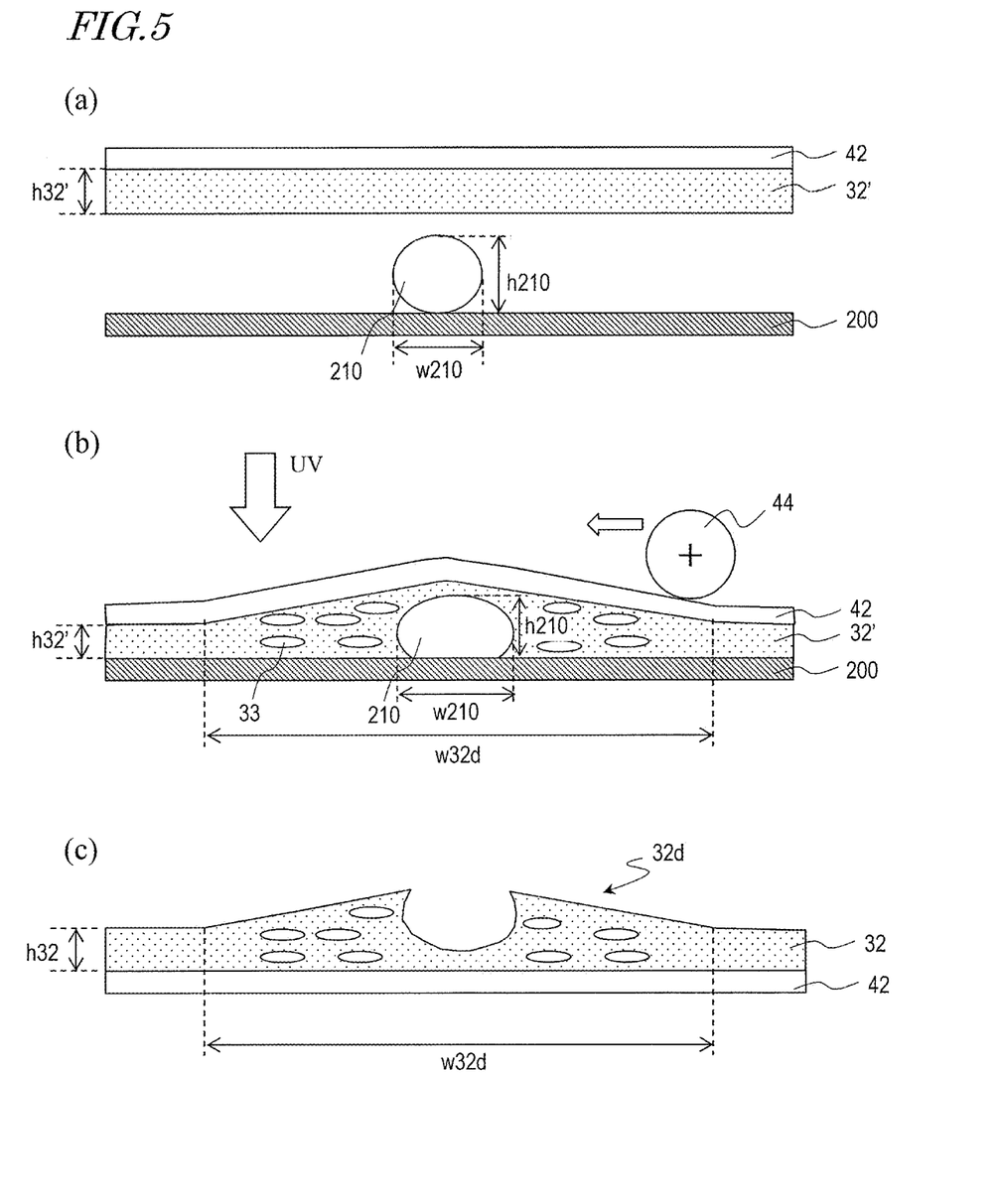
FIG. 5(a) to (c) are schematic cross-sectional views for illustrating occurrence of a defect in an antireflection film which is produced using the comparative example moth-eye mold 200.
Figure 6:
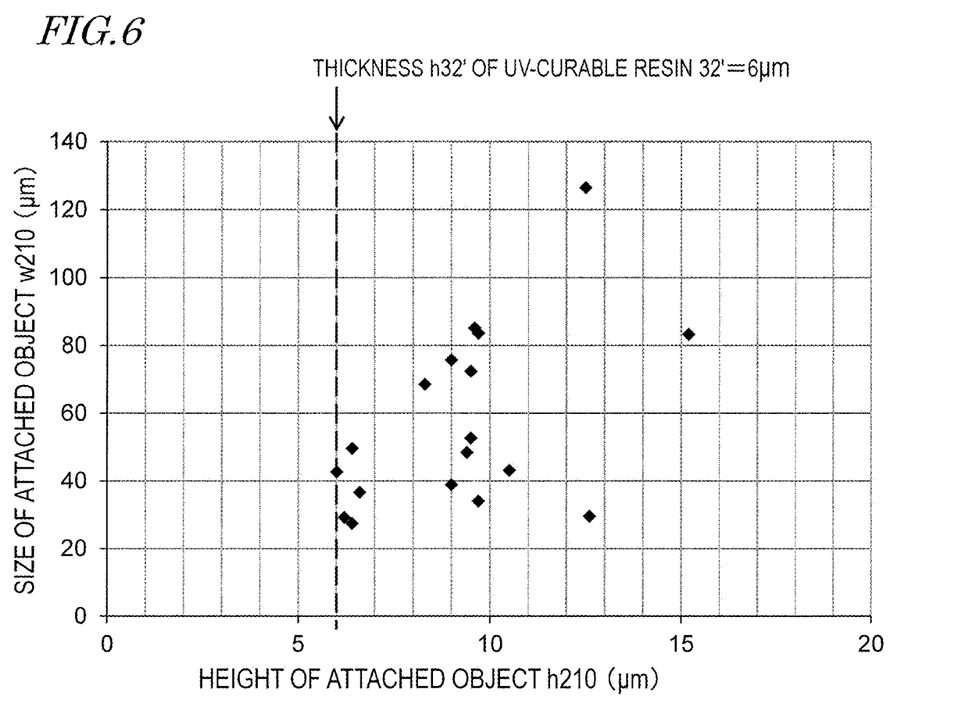
FIG. 6 A graph in which the size w210 of an attached object 210 on the surface of the comparative example moth-eye mold 200 is plotted against the height h210.

The thickness h32' of the UV-curable resin 32' (see FIG. 5(*a*)) applied to the work 42 can also be determined according to the value of the predetermined height $h_{th}$. The UV-curable resin 32' is applied to, for example, the surface of the work 42. The thickness h32' of the UV-curable resin 32' applied to the work 42 has, for example, a value which is equal to the predetermined height $h_{th}$ or a value which is greater than the predetermined height $h_{th}$. The thickness h32' of the UV-curable resin 32' applied to the work 42 is, for example, not less than 3 µm and not more than 200 µm. The thickness h32' of the UV-curable resin 32' applied to the work 42 is, for example, not less than 10 µm and not more than 30 µm.

When the predetermined height $h_{th}$ is less than 3 µm, a large number of protrusions (attached objects) 210 are subjected to laser irradiation, so that the time and/or cost required for the laser light irradiation step increase. From the viewpoint of the time and/or cost required for the laser light irradiation step, the predetermined height $h_{th}$ is preferably not less than 3 µm. When the predetermined height $h_{th}$ is not less than 10 µm, the accuracy of the determination step can improve. That is, the probability of failing to detect a protrusion (attached object) 210 which is greater than the predetermined height $h_{th}$ decreases. As a result, the efficiency of detection of the protrusion 210 that can be the cause of a defect can improve.

The thickness h32' of the UV-curable resin 32' applied to the work 42 can be increased by, for example, using a UV-curable resin 32' which has a high viscosity. If the viscosity of the UV-curable resin 32' is high, there is a probability that the UV-curable resin 32' is less likely to fill the recesses of the inverted moth-eye structure at the surface of the moth-eye mold 200 and, as a result, the antireflection function of a produced antireflection film is disadvantageously suppressed. If the thickness h32' of the UV-curable resin 32' applied to the work 42 is large, the produced antireflection film 32 is soft so that there is a probability that either or both of the following problems arise: the antireflection film 32 is likely to deform; and scratches are likely to be formed in the antireflection film 32.

From the viewpoint of preventing occurrence of the above-described problems, the thickness h32' of the UV-curable resin 32' (see FIG. 5(a)) applied to the work 42 is preferably not more than 200 μm. More preferably, the thickness h32' of the UV-curable resin 32' (see FIG. 5(a)) applied to the work 42 is, for example, not more than 30 μm.

Note that the viscosity of the UV-curable resin 32' can be increased by, for example, increasing the concentration of monomers in the UV-curable resin 32'. The UV-curable resin 32' includes, for example, a solvent in which monomers are dissolved. The UV-curable resin 32' can further include a photopolymerization initiator. The UV-curable resin 32' may further include, for example, oligomers. When the UV-curable resin 32' includes oligomers in addition to monomers, the UV-curable resin 32' can be prevented from decreasing the volume of the antireflection film 32 in production of the antireflection film 32 by curing, and/or the produced antireflection film 32 can be prevented from becoming hard. The UV-curable resin 32' may further include a lubricant (for example, including fluoric lubricants, silicone lubricants, etc.).

In the determination step, the determination may be performed by, for example, directly or indirectly measuring the height h210 of each attached object 210 with the use of a microscope and comparing measurements with the value of the predetermined height $h_{th}$. In the measurement, for example, a laser scanning microscope may be used. For example, a confocal laser scanning microscope is capable of brightly imaging only a focused portion and, due to this characteristic, an image of high resolution can be obtained. When the measurement is combined with scanning in the vertical direction (Z-axis direction), the height can be accurately measured.

When it is determined that the height h210 of the protrusion 210 is greater than the predetermined height $h_{th}$, the protrusion 210 is irradiated with laser light such that the height of the protrusion 210 is lower than the predetermined height $h_{th}$. When irradiated with laser light, the protrusion (attached object) 210 at least partially evaporates or sublimes so that its height h210 decreases. The laser light includes, for example, ultraviolet light, visible light and infrared light. A known laser, for example, such as a solid-state laser (e.g., YAG laser and the like) or a gas laser (e.g., excimer laser, $CO_2$ laser) can be used.

For example, only a protrusion 210 which is determined to have a height h210 greater than the predetermined height $h_{th}$ is selectively irradiated with the laser light. The amount of the laser light can be appropriately set depending on the size of the protrusion 210 and other factors. For example, when a pulsed laser such as a YAG laser is used, the pulse width and the number of irradiations can be modified. When the area irradiated with the laser light is smaller than the protrusion 210, the laser light may be moved relative to the protrusion 210 such that the protrusion 210 is irradiated with the laser light. For example, after the protrusion 210 is irradiated with the laser light, it is determined whether or not the height h210 of the protrusion 210 is greater than the predetermined height $h_{th}$. If it is determined that the height h210 of the protrusion 210 is greater than the predetermined height $h_{th}$, the protrusion 210 is again irradiated with the laser light. These steps may be repeated till it is determined that the height h210 of the protrusion 210 is not more than the predetermined height $h_{th}$.

When the protrusion 210 is irradiated with the laser light multiple times, the irradiation may be performed with varying irradiation areas and/or varying irradiation intensities. For example, the irradiation may be performed in such a manner that the first irradiation is performed with the largest irradiation area while the final irradiation is performed with the smallest irradiation area. For example, the irradiation may be performed in such a manner that the first irradiation is performed with the highest irradiation intensity while the final irradiation is performed with the lowest irradiation intensity.

By the irradiation with the laser light, the protrusion 210 may be substantially thoroughly removed such that a portion of the surface of the moth-eye mold 200 from which the protrusion 210 has been removed has a recess.

When the surface of the moth-eye mold 200 has a plurality of protrusions 210, the above-described detection step, determination step and laser light irradiation step may be performed on each of the protrusions 210, i.e., these steps may be repeated as many as the number of the protrusions 210. Alternatively, the detection step, determination step and laser light irradiation step may be performed only once, simultaneously on all of a plurality of protrusions 210. For example, the detection step may be performed in such a manner that the surface of the moth-eye mold 200 is imaged by a camera, or the like, via a microscope, and protrusions 210 are automatically detected based on the resultant image.

Through the above-described manufacturing process, the moth-eye mold 100A shown in FIG. 1(e) and FIG. 2(d) is obtained.

Patent Document 6 and Patent Document 7 mentioned above disclose mold repairing methods. The mold repairing method of Patent Document 6 includes the foreign object detection step of detecting a foreign object adhering to the surface of a mold and the foreign object removal step of removing the foreign object detected in the foreign object detection step by laser irradiation. Patent Document 6 describes using an atomic-force microscope (AFM) or a scanning electron microscope (SEM) for detection of foreign objects in the mold repairing method of Patent Document 6. The mold repairing method of Patent Document 7 includes the step of filling a defective portion with a repair agent, the step of pressing a repair die against the repair agent, and the step of curing the repair agent by ultraviolet irradiation. The mold repairing method of Patent Document 6 does not intend to selectively remove an attached object which can be the cause of a defect in an antireflection film. The mold repairing method of Patent Document 7 intends to repair a defective portion in the shape of a recess and is not capable of removing an attached object which can be the cause of a defect in an antireflection film.

On the other hand, according to the mold manufacturing method of Embodiment 1 of the present invention, an attached object which can be the cause of a defect in an antireflection film produced with the use of a mold can be selectively removed. Also, before an antireflection film is produced with the use of a mold, an attached object which can be the cause of a defect in the antireflection film can be removed in advance. The decrease in the production yield of the film produced with the use of the mold can be efficiently suppressed.

The advantage achieved by removing an attached object which can be the cause of a defect in an antireflection film in advance before the antireflection film is produced with the use of a mold is briefly described.

When an attached object which can be the cause of a defect in an antireflection film is not removed in advance, for example, production of the antireflection film and repairing of the mold are performed as described in the following. Firstly, an antireflection film is produced at part of the surface of a work (e.g., TAC film). The work has a length of, for example, about 3000 m to about 4000 m and is wound around a winding roller. An antireflection film is produced at the surface of part of the work which has a length of, for example, about 20 m to about 30 m. Before a UV-curable resin is applied to the surface of the work, the work is pulled out from the winding roller. After the antireflection film is produced at the surface, the work is wound up by another winding roller.

Then, it is determined whether or not there is a defect in the produced antireflection film. If there is a defect, a portion corresponding to the defect is specified at the surface of the moth-eye mold, and the moth-eye mold is repaired. The repairing of the moth-eye mold needs to be performed only on the portion specified from the produced film and, therefore, an increase in time and/or procedure required for the repairing step can be suppressed. Also, the influence by the repairing (e.g., laser irradiation) on the surface of the moth-eye mold (e.g., the inverted moth-eye structure) can be suppressed.

Thereafter, an antireflection film is produced at the surface of the remaining part of the work. Since the repairing of the moth-eye mold has been performed, occurrence of a defect in the antireflection film produced at the surface of the remaining part of the work is suppressed.

According to the above-described antireflection film production method and mold repairing method, there is a probability that an antireflection film produced before the repairing of the moth-eye mold has a defect and, therefore, there is a probability that the production yield of the antireflection film disadvantageously decreases. Also, according to the above-described method, after an antireflection film is formed at the surface of part of the work, inspection of the surface of the antireflection film and repairing of the moth-eye mold are performed, and thereafter, an antireflection film is again produced at the surface of the remaining part of the work. In such a production process, there is a probability that the time and/or procedure disadvantageously increase.

On the other hand, if an attached object which can be the cause of a defect in an antireflection film is removed in advance before the antireflection film is produced with the use of a mold, occurrence of the two problems described above can be suppressed. It is estimated that, from the viewpoint of suppressing occurrence of the two problems described above, removing an attached object which can be the cause of a defect in an antireflection film in advance is more effective when the number of attached objects to be removed in advance is small. According to a mold manufacturing method of an embodiment of the present invention, as previously described, an attached object which can be the cause of a defect in an antireflection film can be removed in advance before the antireflection film is produced with the use of a mold.

Moth-eye molds of Example 1a, Example 1b and Comparative Example 1 specified in Table 1 were manufactured, and antireflection films were produced using the respective moth-eye molds.

TABLE 1

| | before laser light irradiation | | after laser light irradiation | |
|---|---|---|---|---|
| | height of attached object (μm) | defect in film | height of attached object (μm) | defect in film |
| Example 1a | 12 | YES | 5 | NO |
| Example 1b | 15 | YES | 2 | NO |
| Comparative Example 1 | 13 | YES | 8 | YES |

In each of the moth-eye molds, one attached object (protrusion) 210 was detected, and the height h210 of the detected attached object 210 was measured. The measurement of the height h210 was carried out using a confocal microscope (hybrid laser microscope OPTELICS (registered trademark) HYBRID standard model L3 manufactured by Lasertec Corporation).

The determination step was performed by comparing the height h210 of the attached object 210 with the predetermined height $h_{th}$. The predetermined height $h_{th}$ was 6 μm. This is equal to the thickness h32' of the UV-curable resin 32' applied to the work 42. Antireflection films were produced using the respective moth-eye molds before laser light irradiation. It was verified that a defect occurs in the antireflection films due to the attached object 210 which is higher than the predetermined height $h_{th}$.

In each of Example 1a, Example 1b and Comparative Example 1, the height h210 of the attached object 210 was greater than the predetermined height $h_{th}$ and, therefore, the attached object 210 was irradiated with laser light. The laser light was YAG laser (wavelength: 532 nm, pulse width: 6 ns). The laser oscillator used was HSL-5000II FS (manufactured by HOYA CANDEO OPTRONICS). The irradiation power of the laser light was 450 mJ. The beam shape of the laser light used for irradiation was a generally square shape of about 30 μm on each side. In Example 1a and Example 1b, the attached object 210 was irradiated with the laser light about 30 to 50 times till the height h210 of the attached object 210 became smaller than the predetermined height $h_{th}$ (6 μm). The irradiation with the laser light was performed while the position to be irradiated with the laser light was appropriately varied in accordance with the attached object 210.

As for the relationship between the irradiation intensity of the laser light and/or the number of irradiations and the amount of the decrease of the height h210 of the attached object 210, a correspondence table was created beforehand using test samples. For the difference between the height h210 of the attached object 210 and the predetermined height $h_{th}$, the number of irradiations with the laser light was determined according to the correspondence table. After the attached object 210 was irradiated with the laser light based on the determined number of irradiations, the height h210 of the attached object 210 was measured, and the irradiation with the laser light was further repeated till the height h210 of the attached object 210 reached the predetermined value.

In Comparative Example 1, the irradiation with the laser light was stopped when the height h210 of the attached object 210 reached 8 μm, which was a value greater than the predetermined height $h_{th}$ (6 μm).

Antireflection films were produced using the respective moth-eye molds after being irradiated with the laser light. In Example 1a and Example 1b, the antireflection films had no defect. In Comparative Example 1, the antireflection film had a defect.

Embodiment 2

The mold manufacturing method of Embodiment 2 of the present invention is different from the mold manufacturing method of Embodiment 1 in that the detection step, the determination step and the laser light irradiation step are performed before the anodization step and the etching step. In the mold manufacturing method of Embodiment 2, the detection step is the step of detecting a protrusion formed at the surface of the mold base. In this specification, the mold base refers to an object of the anodization and the etching in the mold manufacturing process. The mold manufacturing method of Embodiment 2 of the present invention may be the same as the mold manufacturing method of Embodiment 1 except that the detection step, the determination step and the laser light irradiation step are performed before the anodization step and the etching step.

According to the mold manufacturing method of Embodiment 2 of the present invention, an attached object which can be the cause of a defect in an antireflection film produced with the use of a mold can be selectively removed. Also, an attached object which can be the cause of a defect in an antireflection film can be removed in advance before the antireflection film is formed with the use of a mold. The decrease in the production yield of the film produced with the use of a mold can be suppressed.

According to the mold manufacturing method of Embodiment 2 of the present invention, before a porous alumina layer which has a plurality of recessed portions is formed, an attached object on the mold base is irradiated with laser light. Therefore, the influence of the laser light irradiation on the plurality of recessed portions can be reduced.

Figure 3:
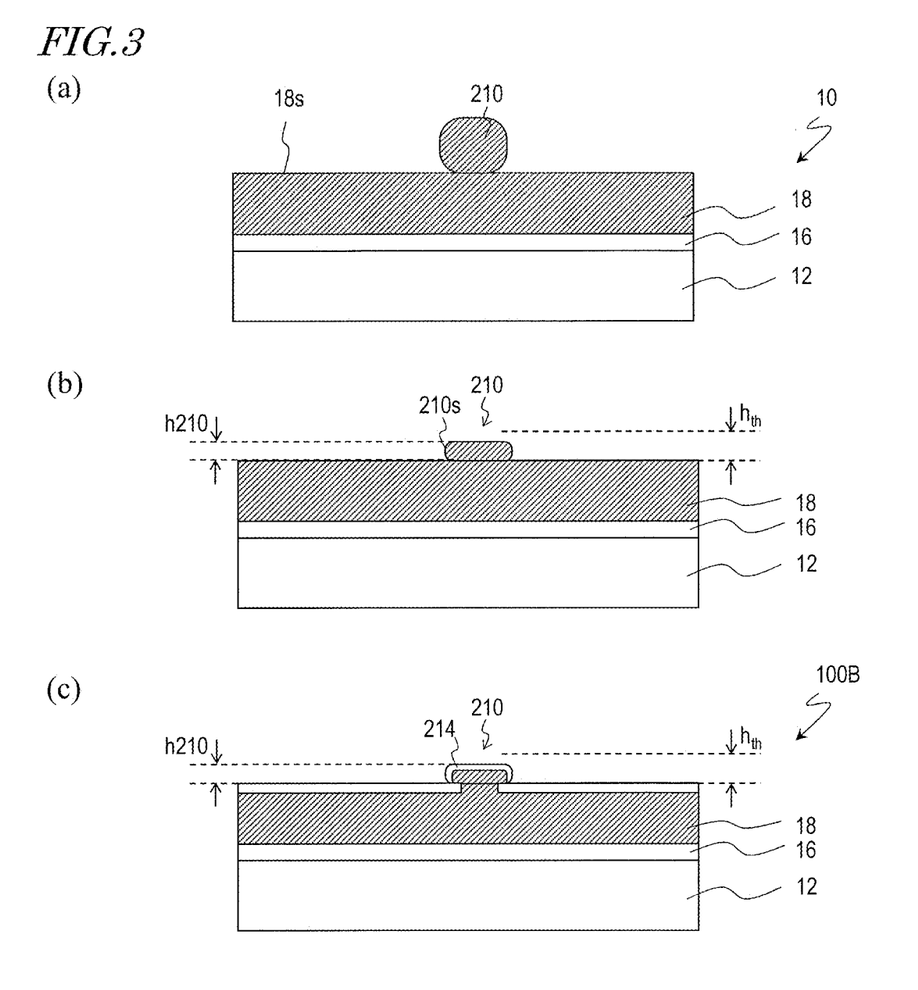
FIG. 3(a) to (c) are schematic cross-sectional views for illustrating a manufacturing method of a moth-eye mold 100B of Embodiment 2 of the present invention.

Next, the mold manufacturing method of Embodiment 2 of the present invention and the configuration of a mold manufactured by that manufacturing method are described with reference to FIG. 1(a) to FIG. 1(e) and FIGS. 3(a) to 3(c). Note that description of substantially the same part as the mold manufacturing method of Embodiment 1 is omitted. FIGS. 3(a) to 3(c) are schematic cross-sectional views for illustrating a manufacturing method of the moth-eye mold 100B of Embodiment 2 of the present invention. FIGS. 3(a) to 3(c) are cross-sectional views of part of the moth-eye mold 100B in which an attached object 210 is present on the surface in the manufacturing process.

Firstly, a mold base 10 shown in FIG. 1(a) and FIG. 3(a) is provided.

Then, a protrusion (attached object) 210 formed at the surface 18s of the mold base 10 is detected.

Then, it is determined whether or not the height h210 of the detected protrusion 210 is greater than the predetermined height $h_{th}$.

If it is determined that the height h210 of the protrusion 210 is greater than the predetermined height $h_{th}$, the protrusion 210 is irradiated with laser light such that the height h210 of the protrusion 210 becomes smaller than the predetermined height $h_{th}$ as shown in FIG. 3(b).

Thereafter, the anodization step and the etching step are performed as shown in FIGS. 1(b) to 1(e) and FIG. 3(c). In the step of anodizing the surface 18s of the aluminum alloy layer 18, the surface 210s of the attached object 210 is also anodized concurrently, so that a porous alumina layer 214 which has a plurality of recessed portions (not shown) is formed as shown in FIG. 3(c). The plurality of recessed portions of the porous alumina layer 214, which are not shown in FIG. 3(c) for the sake of simplicity, may be the same as the plurality of recessed portions 14p of the porous alumina layer 14. There is a probability that the porous alumina layer 14 is not formed on part of the surface 18s of the aluminum alloy layer 18 which is in contact with the attached object 210.

By the above-described manufacturing method, the moth-eye mold 100B shown in FIG. 3(c) is obtained. The cross-sectional view of part of the moth-eye mold 100B which does not have the attached object 210 at the surface is the same as that of the moth-eye mold 100A shown in FIG. 1(e).

In the foregoing, an antireflection film has been described as an example of the film whose surface has a moth-eye structure. However, a mold of an embodiment of the present invention is not limited to this example but is widely applicable to production of a film whose surface has a moth-eye structure. A film production method of an embodiment of the present invention is not limited to antireflection films but is widely applicable to production of a film whose surface has a moth-eye structure. A mold of an embodiment of the present invention can be used for transfer in a wide variety of nanoimprinting techniques.

In the foregoing, a moth-eye mold for formation of a moth-eye structure has been described as an example. However, a mold of an embodiment of the present invention is not limited to this example but is widely applicable to a mold for formation of, for example, raised portions with non-pointed tip ends (e.g., nanopillars). That is, the shape of micro recessed portions at the surface of a mold of an embodiment of the present invention is not limited to a generally conical shape but may be, for example, a generally circular truncated cone or may be a generally cylindrical shape. The bottom of the micro recessed portions is not limited to a pointed bottom but may be, for example, rounded or may be planar. The shape of the opening of the micro recessed portions is not limited to a circular shape but may be rectangular, for example. The plurality of micro recessed portions may be arranged regularly or may be arranged irregularly (randomly).

INDUSTRIAL APPLICABILITY

A mold of the present invention can be used in production of an antireflection film (antireflection surface) or the like.

REFERENCE SIGNS LIST 10 mold base
12 metal base
14, 214 porous alumina layer
14p recessed portion
16 inorganic underlayer
18 aluminum alloy layer
18s, 210s surface
100A, 100B, 200 moth-eye mold
210 attached object (protrusion)

The invention claimed is:
1. A manufacturing method of a mold, the mold having at its surface a plurality of recessed portions whose two-dimensional size is not less than 10 nm and less than 500 nm when viewed in a direction normal to the surface, the method comprising:
(a) providing a mold base which includes a metal base and an aluminum alloy layer formed on the metal base, the aluminum alloy layer having at its surface an attached object including aluminum;
(b) partially anodizing the aluminum alloy layer, thereby forming a porous alumina layer which has a plurality of minute recessed portions;

(c) after step (b), bringing the porous alumina layer into contact with an etching solution, thereby enlarging the plurality of minute recessed portions of the porous alumina layer;

(d) detecting a protrusion including the attached object formed at a surface of the porous alumina layer;

(e) determining whether or not a height of the protrusion detected at step (d) is greater than a predetermined height; and (f) if it is determined at step (e) that the height of the protrusion is greater than the predetermined height, irradiating the protrusion with laser light such that the height of the protrusion becomes smaller than the predetermined height, wherein step (d), step (e) and step (f) are performed after step (b) and step (c).

2. The method of claim 1, wherein the predetermined height is not less than 3 μm and not more than 200 μm.

3. The method of claim 1, wherein the predetermined height is not less than 10 μm and not more than 30 μm.

4. The method of claim 1, wherein the mold base further includes an inorganic underlayer formed between the metal base and the aluminum alloy layer.

5. The method of claim 1 further comprising step (g) after step (c), further performing anodization to grow the plurality of minute recessed portions.

6. The method of claim 5, wherein another step (c) and another step (g) are further performed after step (g).

7. An antireflection film production method, comprising:
providing a mold manufactured by the mold manufacturing method as set forth in claim 1;
providing a work;
irradiating a photocurable resin applied between the mold and a surface of the work with light, thereby curing the photocurable resin; and
peeling the mold off from an antireflection film formed of the cured photocurable resin.

8. The method of claim 7, wherein
the photocurable resin is applied to the surface of the work, and
a thickness of the photocurable resin applied to the surface of the work is equal to or greater than the predetermined height.

9. The method of claim 8, wherein the thickness of the photocurable resin applied to the surface of the work is not less than 3 μm and not more than 200 μm.

10. The method of claim 8, wherein the thickness of the photocurable resin applied to the surface of the work is not less than 10 μm and not more than 30 μm.

11. A manufacturing method of a mold, the mold having at its surface a plurality of recessed portions whose two-dimensional size is not less than 10 nm and less than 500 nm when viewed in a direction normal to the surface, the method comprising:

(a) providing a mold base which includes a metal base and an aluminum alloy layer formed on the metal base, the aluminum alloy layer having at its surface an attached object including aluminum;

(b) partially anodizing the aluminum alloy layer, thereby forming a porous alumina layer which has a plurality of minute recessed portions;

(c) after step (b), bringing the porous alumina layer into contact with an etching solution, thereby enlarging the plurality of minute recessed portions of the porous alumina layer;

(d) detecting the attached object formed at a surface of the mold base;

(e) determining whether or not a height of the attached object detected at step (d) is greater than a predetermined height; and (f) if it is determined at step (e) that the height of the attached object is greater than the predetermined height, irradiating the attached object with laser light such that the height of the attached object becomes smaller than the predetermined height, wherein step (d), step (e) and step (f) are performed before step (b) and step (c).

12. The method of claim 11, wherein the predetermined height is not less than 3 μm and not more than 200 μm.

13. The method of claim 11, wherein the predetermined height is not less than 10 μm and not more than 30 μm.

14. The method of claim 11, wherein the mold base further includes an inorganic underlayer formed between the metal base and the aluminum alloy layer.

15. The method of claim 11 further comprising step (g) after step (c), further performing anodization to grow the plurality of minute recessed portions.

16. The method of claim 15, wherein step (c) and step (g) are further performed after step (g).

17. An antireflection film production method, comprising:
providing a mold manufactured by the mold manufacturing method as set forth in claim 11;
providing a work;
irradiating a photocurable resin applied between the mold and a surface of the work with light, thereby curing the photocurable resin; and
peeling the mold off from an antireflection film formed of the cured photocurable resin.

18. The method of claim 17, wherein
the photocurable resin is applied to the surface of the work, and
a thickness of the photocurable resin applied to the surface of the work is equal to or greater than the predetermined height.

19. The method of claim 18, wherein the thickness of the photocurable resin applied to the surface of the work is not less than 3 μm and not more than 200 μm.

20. The method of claim 18, wherein the thickness of the photocurable resin applied to the surface of the work is not less than 10 μm and not more than 30 μm.

* * * * *